United States Patent [19]

Pemberton et al.

[11] 4,259,984

[45] Apr. 7, 1981

[54] VALVE CONSTRUCTION

[75] Inventors: Eugene B. Pemberton, Fairfield; Richard L. Fahl, Cincinnati, both of Ohio

[73] Assignee: Dover Corporation, New York, N.Y.

[21] Appl. No.: 956,370

[22] Filed: Oct. 31, 1978

[51] Int. Cl.³ ............................................. F16K 15/06
[52] U.S. Cl. ........................... 137/533.31; 137/493.9; 251/364; 251/368
[58] Field of Search ...................... 137/516.29, 533.21, 137/533.31, 543.23, DIG. 3, 493.9; 251/359, 360, 362–365, 368

[56] References Cited

U.S. PATENT DOCUMENTS

| | | | |
|---|---|---|---|
| 1,608,424 | 11/1926 | Putnam | 137/533.31 X |
| 1,751,664 | 3/1930 | Smith | 251/359 X |
| 1,966,264 | 7/1934 | Roye | 137/DIG. 3 |
| 2,163,472 | 6/1939 | Shimer | 137/516.29 |
| 3,083,723 | 4/1963 | Duchin | 137/543.23 X |
| 3,444,889 | 5/1969 | Kiel | 137/516.29 X |
| 3,598,145 | 8/1971 | Wolfson | 251/368 X |
| 3,897,042 | 7/1975 | Kachergis | 137/533.21 X |
| 4,091,837 | 5/1978 | Edmunds | 251/368 X |

*Primary Examiner*—Robert G. Nilson
*Attorney, Agent, or Firm*—Kinney & Schenk

[57] ABSTRACT

A pressure and vacuum relief vent has the stem of each of its pressure and vacuum valves, which are urged to their closed positions by weight, slidably mounted in a bushing of Teflon in a metallic seat ring so that corrosive build up does not occur on the bushing whereby each of the valves is responsive to the desired pressure differential due to weight. Each of the seat rings has a seat insert of Teflon locked in a groove in the seat ring with an epoxy seal between an outer inclined surface of the seat insert and an inner surface of the seat ring.

20 Claims, 6 Drawing Figures

VALVE CONSTRUCTION

In above-ground storage tanks for volatile liquids such as gasoline, for example, it is necessary to be able to vent vapor from the tank when the pressure in the tank exceeds a predetermined pressure to prevent the tank from rupturing and to allow pressure to enter the tank when the pressure in the tank becomes less than atmospheric by a predetermined amount to prevent the tank from collapsing. With gasoline, for example, filling of the tank causes an increase in the pressure within the tank as does an increase in temperature of the gasoline in the tank. When extracting the liquid from the tank, a vacuum can occur therein so that the pressure can become less atmospheric pressure by a predetermined amount.

Accordingly, a pressure and vacuum relief vent is usually mounted on top of these above-ground storage tanks to enable the pressure within the tank to be bled off when it exceeds a predetermined amount by a very small amount such as 0.5 p.s.i., for example, and to enable atmospheric pressure to enter the tank when the pressure within the tank becomes less than atmospheric pressure by a very small predetermined amount such as one-half ounce per square inch, for example, due to a vacuum existing within the tank. Thus, vapor can escape to the atmosphere from the tank under controlled conditions. The pressure and vacuum relief vent utilizes separate pressure and vacuum valves with the pressure valve venting the tank for pressure and the vacuum valve opening to allow pressure to enter the tank when the vacuum within the tank increases beyond a predetermined amount.

Since the pressure and vacuum relief vent is usually mounted on the top of the tank, it is usually thirty to forty feet, for example, above the ground. Because of this location, it is not an easy task to ascertain that each of the valves of the pressure and vacuum relief vent is functioning correctly so that they are seldom checked. Therefore, one of the valves can malfunction whereby uncontrolled venting of the tank can occur to cause undesired pollution of the atmosphere.

Each of the pressure and vacuum valves of the pressure and vacuum relief vent utilizes weight, rather than a spring, to provide the force to control the pressure differential at which the valve opens. The use of weight provides a more precise control of the pressure differential at which either of the valves opens than a spring since weight produces a constant, selected force while a spring has tolerances whereby its force is not constant.

However, the use of weight to control the pressure differential at which the valve opens results in any additional force required for valve opening to cause an increase in the pressure differential before the valve will open. That is, if the valve disc is retarded in its movement for any reason, then a greater pressure differential is required to cause the valve disc to be moved away from the valve seat when using weight whereas the spring may be able to compensate for this retarding of the valve disc.

The corrosive effects from gasoline or other petroleum products stored in the tank and the build up of moisture on the various exposed parts of the pressure and vapor relief vent have created problems of opening either of the valves of the vent when the desired pressure differential occurred thereacross. This is because the corrosion tends to build up on any mating and moving parts so as to produce a drag force. For example, corrosion builds up on both the metallic seat ring and the metallic valve disc simultaneously and tends to hold them together.

If the pressure differential across the valve disc increased sufficiently to break this build up of the corrosion between the seat ring and the valve disc, then the valve disc and the valve seat would not have an effective seal when the valve disc returned to its closed position because of the residue of the corrosion build up on the valve disc and the valve seat. Thus, if the valve disc could be opened after corrosion build up, the return of the valve disc to its closed position would result in the tank continuing to leak vapor at all times. With this occurring, there would be pollution of the atmosphere beyond that controlled by the pressure valve of the pressure and vacuum relief vent.

Additionally, because each of the valves of the pressure and vacuum relief vent is controlled in its opening and closing by weight rather than a spring, it is necessary that each of the valves be freely movable. That is, if there is any binding of the axial movement of either of the valve discs, it will not move in response to the desired pressure differential for either pressure or vacuum change in the tank because of the drag force due to the binding.

The stem of the valve disc would tend to stick in the bore of the metallic seat ring because of the corrosion build up between the two metallic surfaces of the moving and mating parts. Thus, the valve disc could not freely move when corrosion built up.

Therefore, the weight controlled valve discs do not always necessarily respond to the desired pressure differential thereacross. That is, each valve disc would require a substantially larger pressure differential thereacross to move to its open position, if it was capable of moving to its open position, depending upon the build up of corrosion between the valve disc and the seat or between the stem on the valve disc and the seat ring in which the stem axially moved.

Because of the location of the pressure and relief vent on the top of the tank, inspection does not occur very often. Therefore, vapors could be released to the atmosphere through an open valve for a long period of time prior to it being ascertained that one of the valves of the pressure and vacuum relief vent is malfunctioning.

The present invention satisfactorily overcomes the foregoing problems through providing a non-metallic seat insert for each of the valve discs and a non-metallic bushing in the seat ring for the stem of each of the valve discs. As a result, there will not be the build up of corrosion on the seat insert or the bushing.

Each of the valve discs is supported by the cooperating seat ring so that it has free sliding action relative thereto because of the non-metallic bushing being employed in the seat ring with sufficient clearance with the stem on the valve disc while the bushing still insures axial motion of the valve disc. The bushing is formed of a suitable material such as Teflon, for example, so as to have a low friction relationship with the stem of the valve disc.

An object of this invention is to provide a unique seat insert for a valve.

Another object of this invention is to provide a valve seat insert that is locked in position in a seat ring of a valve.

A further object of this invention is to provide a weight controlled valve having an easy movable valve disc.

Other objects, uses, and advantages of this invention are apparent upon a reading of this description, which proceeds with reference to the drawings forming part thereof and wherein.

Figure 1:
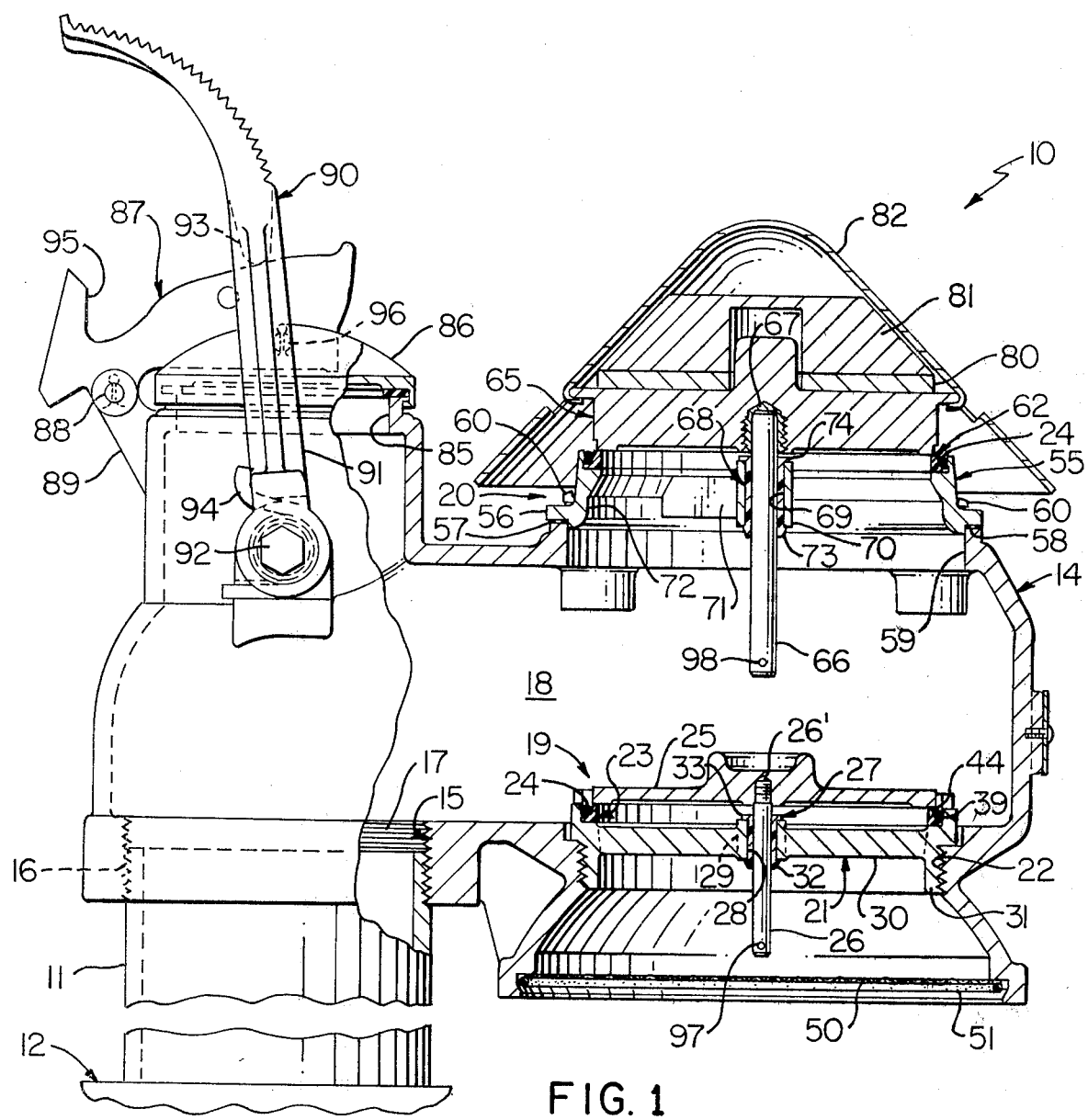
FIG. 1 is a sectional view, partly in elevation, of a pressure and vacuum relief vent having the non-metallic seat inserts and bushings of the present invention for the pressure and vacuum valves.

Referring to the drawings and particularly FIG. 1, there is shown a pressure and vacuum relief vent 10. The vent 10 is mounted on the upper end of a vent pipe 11, which extends upwardly from an above ground storage tank 12.

The vent 10 includes a body 14, which is preferably formed of cast iron, having threads 15 for mating with threads 16 on the upper end of the vent pipe 11. The vent pipe 11 provides communication from the tank 12 through a passage 17, which is defined by the threads 15, in the body 14 to a chamber 18 in the body 14.

The chamber 18 in the body 14 can communicate with the atmosphere through a vacuum vent valve 19 and a pressure vent valve 20. Each of the vacuum vent valve 19 and the pressure vent valve 20 is urged to its closed position by weight.

The vacuum vent valve 19 includes a seat ring 21, which is formed of a suitable metallic material such as aluminum, for example, mounted within the body 14 by cooperating threads 22 on the seat ring and the body 14. The seat ring 21 has a seat insert 23 locked therein.

The seat insert 23 is formed of a non-metallic material. One suitable example of the non-metallic material of the seat insert 23 is virgin polytetrafluoroethylene sold under the trademark Teflon. The seat insert 23 is sealed to the seat ring 21 by a sealing material 24, which is preferably an epoxy adhesive sold as FE-086 RESI-WELD epoxy by H. B. Fuller Company, Minneapolis, Minnesota.

A metallic disc 25 of the vacuum vent valve 19 sits on the seat insert 23 to form a seal therebetween to prevent flow from the chamber 18 in the body 14 to the atmosphere. The disc 25 has a stem 26 secured thereto by cooperating threads 26' on the end of the stem 26 and in the disc 25. The stem 26 extends downwardly from the disc 25 through a bushing 27 in a bore 28 in a central circular portion 29 having a pair of aligned arms 30 extending therefrom to an outer wall 31 of the seat ring 21.

The bushing 27 is firmly retained in the bore 28 by an enlarged lower portion 32 engaging the bottom surface of the central circular portion 29 of the seat ring 21 and a flange 33 on its upper end engaging the upper surface of the central circular portion 29 of the seat ring 21. The bushing 27 is formed of a material having a low coefficient of friction such as virgin polytetrafluoroethylene sold under the trademark Teflon, for example.

Figure 2:
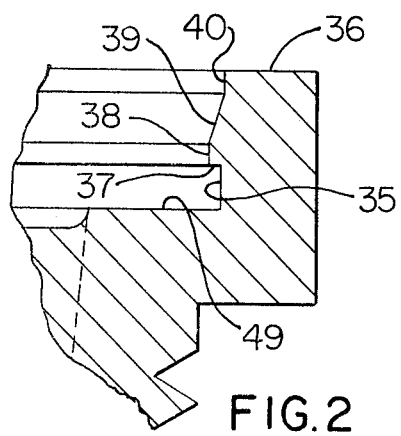
FIG. 2 is an enlarged fragmentary sectional view, partly in elevation, of a portion of the seat ring for the vacuum valve of FIG. 1.

As shown in FIG. 2, the seat ring 21 has a groove 35 formed in the bottom portion of the inner surface of an upstanding annular projection 36 on the seat ring 21. The groove 35 receives the seat insert 23 therein as shown in FIG. 1.

The inner surface of the upstanding projection 36 (see FIG. 2) has an inwardly projecting shoulder or flange 37 on its inner surface at the top of the groove 35. Thus, the seat insert 23 (see FIG. 1) is locked within the groove 35 (see FIG. 2) of the seat ring 21.

The projection 36 of the seat ring 21 has a flat portion 38 of its inner surface extending upwardly from the shoulder 37 and perpendicular thereto. The flat portion 38 is the smallest diameter of the inner surface of the projection 36.

The inner surface of the annular projection 36 of the seat ring 21 has an inclined portion 39 extending upwardly from the flat portion 38 and increasing in diameter as it extends upwardly. The inner surface of the projection 36 of the seat ring 21 terminates in a flat portion 40, which has a larger diameter than the groove 35.

Figure 3:
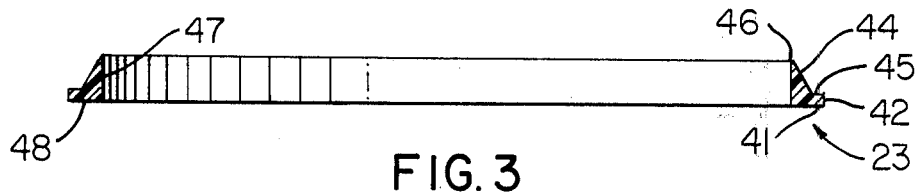
FIG. 3 is a sectional view of a seat insert used with the pressure or vacuum valve of FIG. 1.

Referring to FIG. 3, the seat insert 23 has a lip 41 at its bottom. The lip 41 has its outer surface 42 formed with a diameter smaller than the diameter of the groove 35 in the seat ring 21 but larger than the diameter of the flat portion 38 of the inner surface of the projection 36 of the seat ring 21.

The seat insert 23 also has an inclined outer surface 44 extending upwardly from an upper surface 45 of the lip 41 of the seat ring 23 to a flat upper portion 46 of the seat insert 23 and at an angle of 30° to the vertical. The seat insert 23 has a continuous smooth inner surface 47.

To insert the seat insert 23 within the groove 35 (see FIG. 2) in the seat ring 21, the lip 41 (see FIG. 3) of the seat insert 23 is forced over the inclined portion 39 (see FIG. 2) of the inner surface of the projection 36 of the seat ring 21, then past the flat portion 38 of the inner surface of the projection 36 of the seat ring 21, and into the groove 35. Thus, the lip 41 (see FIG. 3) of the seat insert 23 is disposed within the groove 35 (see FIG. 2) in the seat ring 21 so as to be locked therein through the shoulder 37 of the seat ring 21 abutting the upper surface 45 (see FIG. 3) of the lip 41 of the seat insert 23 and the seat insert 23 having its bottom surface 48 resting on a flat surface 49 (see FIG. 2) of the seat ring 21.

It should be understood that the forcing of the lip 41 (see FIG. 3) of the seat insert 23 over the inclined portion 39 (see FIG. 2) of the inner surface of the projection 36 of the seat ring 21 is required on only a portion of the circumference of the lip 41 (see FIG. 3) of the seat insert 23 since part of the circumference of the lip 41 of the seat insert 23 can be easily inserted into the groove 35 (see FIG. 2). The part of the lip 41 (see FIG. 3) of the seat insert 23 forced over the inclined portion 39 (see FIG. 2) of the inner surface of the projection 36 of the seat ring 21 is forced thereover in a "shoehorn" type of movement by the installer pushing with both hands.

With the seat insert 23 positioned in the groove 35 in the seat ring 21 as shown in FIG. 1, the inclined surface 44 of the seat insert 23 and the inclined portion 39 of the inner surface of the projection 36 of the seat ring 21 cooperate to form a diverging annular channel therebetween to receive the sealing material 24. When the sealing material 24 is the FE-086 RESIWELD epoxy by H. B. Fuller Company, one part of the resin is mixed with two parts of the hardener with minimum air entrapment. This minimum air entrapment is accomplished through using a plastic bottle having a conical spout one-eighth inch in diameter and pressurized at the bottom by air pressure. This mixture has a maximum mixture pot life time of two hours. After the sealing material 24 has been deposited, it must cure for a minimum of forty-eight hours at room temperature in a level position without weights prior to any further processing.

The sealing material 24 is sufficiently elastic to prevent leaks, particularly when the seat insert 23 expands or contracts with respect to the seat ring 21 because of a change in temperature. This expansion or contraction is due to the coefficient of expansion of polytetrafluoroethylene being six to ten times greater than the coefficient of expansion of aluminum, which is the material of the seat ring 21.

By mounting the seat insert 23 in the groove 35 (see FIG. 2) in the seat ring 21, there are two 90° turns from the flat surface 45 (see FIG. 3) of the lip 41 of the seat insert 23 at the bottom of the sealing material 24 (see FIG. 1) to the inferior of the seat ring 23. This aids in providing maximum resistance to any seal leakage if the sealing material 24 should fail.

The body 14 has a screen 50 mounted at the outlet of the vacuum vent valve 19 to the atmosphere. The screen 50 is retained on the body 14 by a retaining ring 51.

The pressure vacuum valve 20 includes a seat ring 55, which is formed of the same material as the seat ring 21. The seat ring 55 has a circumferential flange 56 acting through a gasket 57 against a flat annular surface 58 of the body 14. The flat, annular surface 58 defines the outlet of a passage 59 in the body 14 from the chamber 18 in the body 14 to the atmosphere.

Figure 5:
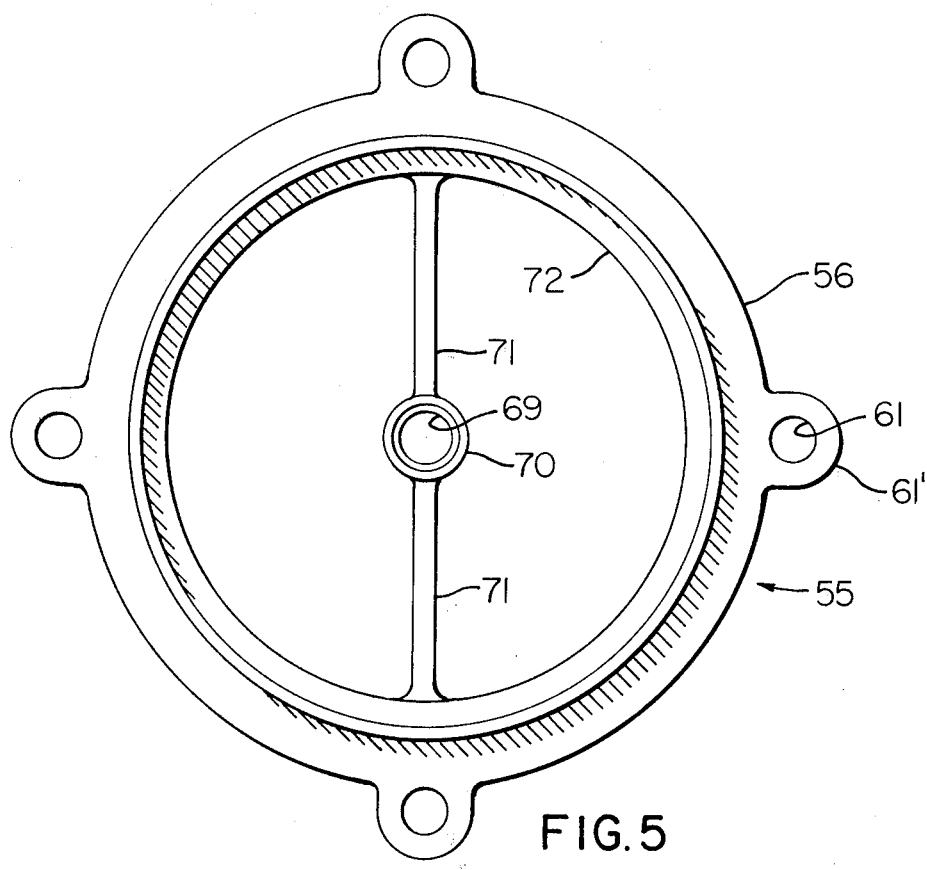
FIG. 5 is a top plan view of the seat ring of the pressure valve of FIG. 1.

The seat ring 55 is retained on the body 14 by four screws 60 (two shown) extending through holes 61 (see FIG. 5) in four equally angularly spaced ears 61' extending from the flange 56 of the seat ring 55. The screws 60 extend into threaded holes (not shown) in the body 14 (see FIG. 1).

The seat ring 55 has a seat insert 62 locked therein. The seat insert 62 is formed of the same material as the seat insert 23 and has the same configuration. The seat insert 62 is sealed to the seat ring 55 by the sealing material 24.

A disc 65 of the pressure vent valve 20 sits on the seat insert 62 to form a seal therebetween to prevent flow from the chamber 18 in the body 14 to the atmosphere through the passage 59. The disc 65 has a stem 66 secured thereto by a fusible material 67, which will melt at a selected temperature such as 200° F., for example. The fusible material 67 is used so that the connection of the stem 66 to the disc 65 melts in case of fire and allows the pressure disc 65 to be blown off by the pressure in the tank 12.

The stem 66 extends downwardly from the disc 65 through a bushing 68 in a bore 69 in a central circular portion 70 having a pair of aligned arms 71 (see FIG. 5) extending therefrom to an outer wall 72 of the seat ring 55. The bushing 68 (see FIG. 1) is formed of the same material as the bushing 27 and is retained in the bore 69 by an enlarged lower portion 73 and an upper flange 74 in the same manner as the bushing 27 is retained in the bore 28.

Figure 4:
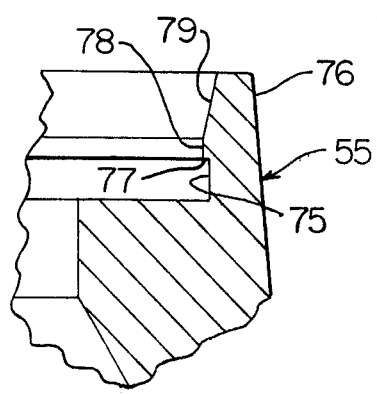
FIG. 4 is an enlarged fragmentary sectional view, partly in elevation, of a portion of the seat ring for the pressure valve of FIG. 1.

As shown in FIG. 4, the seat ring 55 has a groove 75 formed in the bottom portion of the inner surface of an upstanding annular projection 76 on the seat ring 55. The groove 75 receives the seat insert 62 as shown in FIG. 1.

The inner surface of the upstanding projection 76 (see FIG. 4) has an inwardly projecting shoulder or flange 77 on its inner surface at the top of the groove 75. Thus, the seat insert 62 (see FIG. 1) is locked within the groove 75 (see FIG. 4) of the seat ring 55.

The projection 76 of the seat ring 55 has a flat portion 78 of its inner surface extending upwardly from the shoulder 77 and perpendicular thereto. The flat portion 78 is the smallest diameter of the inner surface of the projection 76.

The inner surface of the annular projection 76 of the seat ring 55 has an inclined portion 79 extending upwardly from the flat portion 78 and increasing in diameter as it extends upwardly. The inclined portion 79 extends to the top of the projection 76 of the seat ring 55.

The seat insert 62 (see FIG. 1) is inserted within the groove 75 (see FIG. 4) in the seat ring 55 in a manner similar to that described for mounting the seat insert 23 (see FIG. 1) in the seat ring 21. Thus, the seat insert 62 is locked within the seat ring 55 and sealed therein.

Because the desired pressure differential at which the disc 65 moves to an open position is greater than the pressure differential required by the weight of the disc 65 and the stem 66, additional weights 80 and 81 are mounted on top of the disc 65 and retained thereon by a cap 82. As an example, the weights 80 and 81 along with the weight of the disc 65 and the stem 66 combine to require a pressure differential of one-half p.s.i. to move the disc 65 to an open position.

The weight of the disc 25 and the stem 26 of the vacuum vent valve 19 is such that only one-half ounce per square inch pressure differential is required to move the disc 25 to an open position. Thus, when the vacuum within the tank 12 is one-half ounce per square inch less than the atmospheric pressure, the disc 25 of the vacuum vent valve 19 opens.

The body 14 has an opening 85 to enable inspection and cleaning of the chamber 18 in the body 14. A cap 86 normally closes the opening 85.

The cap 86 has a carrier 87, which is pivotally mounted by a pin 88 between a pair of ears 89 (one shown) on the body 14, acting against its top. A yoke 90, which has a pair of bifurcated arms 91 (one shown) pivotally mounted on opposite ends of a stud 92 extending through the body 14, has a projection 93 acting on the upper surface of the carrier 87. Springs 94 (one shown) at each end of the stud 92 act on the arms 91 to cause the projection 93 on the yoke 90 to urge the cap 86 to its closed position.

When it is desired to open the cap 86 to inspect the interior of the chamber 18 of the body 14 or to clean it, the yoke 90 is urged counterclockwise about the axis of the yoke stud 92 and against the force of the springs 94 until a surface 95 of the carrier 87 is engaged by the projection 93 on the yoke 90. When this happens, the carrier 87 pivots counterclockwise about the pin 88 and the cap 86 moves with the carrier 87 since it is pivotally connected thereto by a pin 96.

To assemble the valves 19 and 20, the stem 66 is soldered to the disc 65 by the fusible material 67. Next, the seat rings 21 and 55 are deburred.

Then, the bushing 68 is installed in the bore 69 in the seat ring 55. This is accomplished by the use of a mandrel and an arbor press.

Next, the seat insert 62 is mounted in the seat ring 55 in the manner previously described. Thereafter, the sealing material 24 is applied in the manner previously described.

In a similar manner to the formation of the sub-assembly of the seat ring 55, the bushing 27 is installed in the bore 28 in the seat ring 21 by the use of a mandrel and an arbor press. Then, the seat insert 23 is mounted in the seat ring 21 in the manner previously described. Thereafter, the sealing material 24 is applied in the manner previously described to form the sub-assembly of the seat ring 21.

After the sealing material 24 has cured, the upper flat surface 46 (see FIG. 3) of the seat insert 23 and the upper flat surface of the seat insert 62 (see FIG. 1) are machined to provide the desired seating surfaces. Then, the sub-assembly of the seat ring 21 and the seat insert 23 is installed in the body 14. Thereafter, the stem 26 is threaded into the vacuum disc 25, which is then mounted with the stem 26 extending through the bushing 27 and retained therein by a cotter pin (not shown) extending through an opening 97 in the bottom of the stem 26.

Next, the stem 66 is passed through the bushing 68 for retention therein by a cotter pin (not shown) passing through an opening 98 in the bottom of the stem 66. Then, the sub-assembly of the pressure seat ring 55, the seat insert 62, and the disc 65 is mounted on the body 14 by the screws 60.

Figure 6:
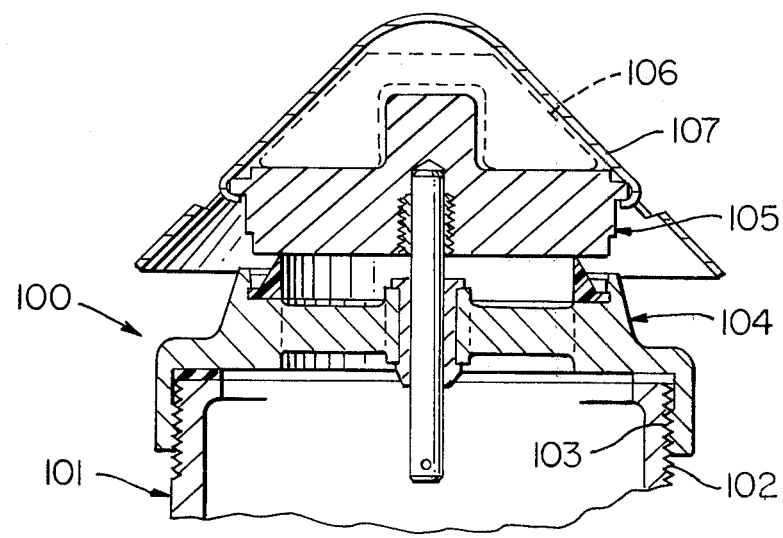
FIG. 6 is a fragmentary sectional view, partly in elevation, of a different type of pressure valve used with the pressure and vacuum relief vent of FIG. 1.

Referring to FIG. 6, there is shown a portion of a pressure and vacuum relief vent 100. The vent 100 includes a body 101, which is the same as the body 14 except that threads 102 are formed thereon for cooperation with threads 103 on a seat ring 104. Thus, in this embodiment, the seat ring 104 is retained on the body 101 by the threads 102 and 103 rather than by the screws 60.

Additionally, a pressure disc 105 has only a single weight 106 retained thereon by a cap 107. This is because the pressure disc 105 is sealing a smaller opening.

The remainder of the structure of the pressure and vacuum relief vent 100 is the same as that shown and described for the pressure and vacuum relief vent 10.

An advantage of this invention is that it is easy to assemble. Another advantage of this invention is that proper seating of the vacuum and pressure valve discs of the pressure and vacuum relief vent is obtained even if an epoxy seal should fail. A further advantage of this invention is that it provides maximum resistance to seal leakage even if the sealing material ceases to be effective. Still another advantage of this invention is that corrosion does not affect the movement of the valve disc or its seating. A still further advantage of this invention is that there is a higher degree of self-centering of each of the valve discs than previously obtainable.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A valve including a seat ring of a metallic material, a seat insert of a non-metallic material having a coefficient of expansion several times larger than the coefficient of expansion of the metallic material of said seat ring, means to lock said seat insert in said seat ring irrespective of whether said seat insert expands or contracts relative to said seat ring due to temperature change, elastic adhesive means adhering to said seat insert and said seat ring to seal said seat insert in said seat ring in its locked position, and closing means slidably supported by said seat ring and engageable with said seat insert to block flow through said seat ring, said closing means being movable to an open position when the pressure differential thereon produces a force exceeding the force exerted by said closing means.

2. The valve according to claim 1 in which said seat insert is formed of polytetrafluoroethylene.

3. The valve according to claim 2 in which said locking means includes means in said seat ring to receive said seat insert so that said seat insert is retained therein irrespective of whether said seat insert expands or contracts relative to said seat ring due to temperature change.

4. The valve according to claim 3 in which said seat insert comprises a ring having a lip at its bottom and an inclined outer surface portion extending upwardly from said lip, said inclined outer surface portion has a maximum diameter less than the diameter of said lip; said seat ring has a groove to receive said lip of said ring of said seat insert; and said locking means includes means to retain said lip of said ring of said seat insert in said groove of said seat ring.

5. The valve according to claim 4 in which said closing means includes a body engaging said seat insert, said body has a stem downwardly extending therefrom, said seat ring has a bore and a bushing in said bore of said seat ring to have said stem slidable therein to slidably support said closing means, said bushing is formed of a non-metallic material having a coefficient of expansion several times larger than the coefficient of expansion of the material of said seat ring, the non-metallic material of said bushing has a low coefficient of friction, and means to retain said bushing in said bore.

6. The valve according to claim 5 in which said bushing is formed of polytetrafluoroethylene.

7. The valve according to claim 4 in which said retaining means of said locking means includes a portion of the inner surface of said seat ring adjacent said groove in said seat ring and said portion of the inner surface of said seat ring has a constant diameter less than the diameter of the outer surface of said lip of said seat insert.

8. The valve according to claim 7 in which the inner surface of said seat ring has an inclined portion extending from said portion of constant diameter and away from said groove, said inclined surface has a maximum diameter greater than the diameter of said groove, and said inclined portion is disposed opposite said inclined outer surface portion of said seat insert to form a diverging annular chamber therebetween for said elastic adhesive means.

9. The valve according to claim 1 in which said locking means includes means in said seat ring to receive said seat insert so that said seat insert is retained therein irrespective of whether said seat insert expands or contracts relative to said seat ring due to temperature change.

10. The valve according to claim 9 in which said seat insert comprises a ring having a lip at its bottom end and an inclined outer surface portion extending upwardly from said lip, said inclined outer surface portion has a maximum diameter less than the diameter of said lip; said seat ring has a groove to receive said lip of said ring of said seat insert; and said locking means includes means to retain said lip of said ring of said seat insert in said groove of said seat ring.

11. The valve according to claim 10 in which said closing means includes a body engaging said seat insert, said body has a stem downwardly extending therefrom, said seat ring has a bore and a bushing in said bore of said seat ring to have said stem slidable therein to slidably support said closing means, said bushing is formed of a non-metallic material having a coefficient of expansion several times larger than the coefficient of expansion of the material of said seat ring, the non-metallic material of said bushing has a low coefficient of friction, and means to retain said bushing in said bore.

12. The valve according to claim 11 in which said bushing and said seat insert are formed of the same material.

13. The valve according to claim 10 in which said retaining means of said locking means includes a portion of the inner surface of said seat ring adjacent said groove in said seat ring and said portion of the inner surface of said seat ring has a constant diameter less than the diameter of the outer surface of said lip of said seat insert.

14. The valve according to claim 13 in which the inner surface of said seat ring has an inclined portion extending from said portion of constant diameter and away from said groove, said inclined surface has a maximum diameter greater than the diameter of said groove, and said inclined portion is disposed opposite said inclined outer surface portion of said seat insert to form a diverging annular chamber therebetween for said elastic adhesive means.

15. The valve according to claim 1 in which said closing means includes a body engaging said seat insert, said body has a stem downwardly extending therefrom, said seat ring has a bore and a bushing in said bore of said seat ring to have said stem slidable therein to slidably support said valve member, said bushing is formed of a non-metallic material having a coefficient of expansion several times larger than the coefficient of expansion of the material of said seat ring, the non-metallic material of said bushing has a low coefficient of friction, and means to retain said bushing in said bore.

16. The valve according to claim 15 in which said bushing and said seat insert are formed of the same material.

17. The valve according to claim 15 in which each of said bushing and said seat insert is formed of polytetrafluoroethylene.

18. The valve according to claim 15 in which said bushing is formed of polytetrafluoroethylene.

19. A valve, comprising:
(a) a valve body;
(b) a seat ring fitted within said body, said seat ring having an annular groove on its inner surface and a bore concentric to said annular groove;
(c) a bushing formed of a non-metallic material having a coefficient of expansion several times that of the coefficient of the seat ring, said bushing being disposed in said bore:
(d) a seat insert having a lip at its bottom end which is fitted into said annular groove and an inclined outer surface portion extending upwardly from said lip, said inclined outer surface portion containing a maximum diameter less than the diameter of said lip, said seat insert being formed of a non-metallic material having a coefficient of expansion several times that of the coefficient of the material of the seat ring; and
(e) a closure member having a stem, said closure member being movable from a first position engaging the seat insert to a second position out of engagement with said seat insert, said stem being disposed in said bore in sliding relationship to said bushing.

20. A valve, comprising:
(a) a valve body;
(b) a seat ring fitted within said valve body, said seat ring having an internal groove and an inclined inner surface proximal to said groove; p1 (c) a seat insert having a lip at its bottom end fitted into said groove of said seat ring and an inclined outer surface portion extending upwardly from said lip away from the inclined inner surface of said seat ring, said inclined outer surface portion of said seat insert having a maximum diameter less than the diameter of said lip and cooperating with said inclined inner surface of said seat ring to form a diverging annular chamber therebetween; and
(d) elastic adhesive means in said diverging annular chamber for sealing said seat insert to said seat ring.

* * * * *